E. A. Chubb.
Plow Wheel.
N° 95,194. Patented Sep. 28, 1869.

Witnesses
James Thierry.
H. F. Eberts.

Inventor.
E. A. Chubb
per Attorney
Thos S Sprague

UNITED STATES PATENT OFFICE.

EDWIN A. CHUBB, OF IONIA, MICHIGAN.

IMPROVEMENT IN PLOW-WHEELS.

Specification forming part of Letters Patent No. 95,194, dated September 28, 1869.

*To all whom it may concern:*

Be it known that I, EDWIN A. CHUBB, of Ionia, in the county of Ionia and State of Michigan, have invented a new and useful Improvement in Plow-Wheels; and I do declare that the following is a true and accurate description thereof, reference being had to the accompanying drawings, and to the letters of reference marked thereon, and being a part of this specification.

Figure 1:
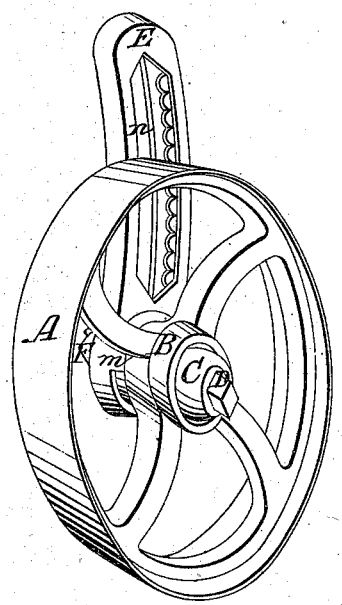
Figure 2:
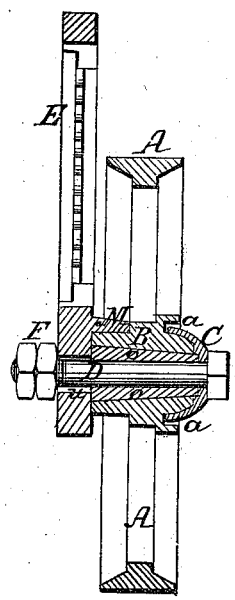
Figure 3:
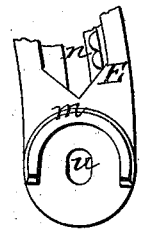

Figure 1 is a perspective, Fig. 2 a vertical section, and Fig. 3 a sectional plan, of the lower end of the connecting plate or shank.

Like letters indicate like parts in each figure.

The nature of this invention relates to an improvement in the construction of plow and cultivator wheels, so that no dirt or grit can enter the journal or bearing, and in such a manner that when the journal or bearing wears it can be replaced without the expense of purchasing a new wheel.

The invention consists in a cap fitting over the outer end of the journal and a hood upon the shank, by means of which dirt or grit are prevented from entering the bearing.

It also consists in inserting into the wheel a conical cylindrical bearing or internal revolving hub, within and through which the arm passes, by means of which the wheel is connected to the shank or connecting-plate, which is provided with a slot, through which said arm is secured, this slot being intended to allow of a vertical adjustability of the shank upon the arm as the bearing wears, in order to keep the hood at all times in its proper relative position to keep out the dirt.

The invention also consists in a peculiar arrangement of its various parts, as more fully hereinafter described.

In the drawings, A represents a wheel, of any proper size, provided with a conical opening through the hub B, around which is the channel or recess $a$. A cap, C, cast in the form shown in the drawings, and provided in its center with a suitable hole, through which the arm D passes, fits into this channel or recess and effectually excludes all dirt or grit from entering at this end of the hub B. Within the conical opening through hub B is inserted a loosely-fitting conical sleeve or internal revolving bearing or hub, $o$, through which the arm or bolt B also passes. Said sleeve $o$ should be made a little longer than the hub B. A connecting plate or shank, E, provided with a slot, $n$, is employed to secure the wheel to a plow or cultivator beam by means of a suitable bolt passing through said beam and slot $n$. Near the lower end of this shank E, and rigidly secured thereto, either by being cast therewith or otherwise, is a semicircular hood, $m$, which is designed to overlap the inner end of the hub B for the purpose of preventing dirt or grit from entering between the face of the shank and the end of the hub against which it presses when in place. The shank is also provided with a slot, $u$, through which the bolt D passes.

All the parts, being constructed as described and put together, are held in position by the bolt D and nut and jam-nut F, which are screwed up until the sleeve $o$ is held rigidly upon said bolt by means of the shank E and cap C pressing firmly against each end thereof. The wheel in revolving rotates around the sleeve $o$, thereby securing a larger bearing-surface than is usually had in wheels for the same purpose. As the sleeve $o$ wears, the nuts F may be loosened, so that the shank will drop correspondingly upon the bolt, so that the hood $m$ will always be adjusted to its position upon the hub B, thereby securing firmness to the parts. Whenever the sleeve $o$ is worn out it may be removed entirely and a new one inserted.

What I claim as my invention, and desire to secure by Letters Patent, is—

1. The slotted shank E, provided with slot $n$ and hood $m$, substantially as described, for the purposes specified.

2. The cap C, in connection with the channel or recess $a$ in the hub B, for the purposes set forth.

3. The arrangement of the wheel A, hub B, cap C, bolt D, shank E, sleeve $o$, recess $a$, and hood $m$, when constructed and operating substantially as herein described.

EDWIN A. CHUBB.

Witnesses:
ISAAC W. HAYCK,
ARBA CHUBB.